(12) United States Patent
Mitchell et al.

(10) Patent No.: US 6,920,480 B2
(45) Date of Patent: *Jul. 19, 2005

(54) METHODS AND APPARATUS FOR EFFICIENTLY TRANSMITTING INTERACTIVE APPLICATION DATA BETWEEN A CLIENT AND SERVER USING MARKUP LANGUAGE

(75) Inventors: David C. Mitchell, Orem, UT (US); Ben Walters, Salt Lake City, UT (US); Dale Mitchell, Orem, UT (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 564 days.

This patent is subject to a terminal disclaimer.

(21) Appl. No.: 10/004,199

(22) Filed: Nov. 2, 2001

(65) Prior Publication Data

US 2002/0116455 A1 Aug. 22, 2002

Related U.S. Application Data

(63) Continuation of application No. 09/391,068, filed on Sep. 7, 1999, now Pat. No. 6,356,933.

(51) Int. Cl.[7] ............................ G06F 15/16; G06F 9/44
(52) U.S. Cl. ...................... 709/203; 719/315; 719/328; 719/329; 715/513; 345/762
(58) Field of Search ................................. 715/513, 511, 715/523, 524; 709/315, 328, 329, 203; 345/762; 717/171, 172; 707/103, 201, 203

(56) References Cited

U.S. PATENT DOCUMENTS

| | | | |
|---|---|---|---|
| 5,291,587 A | 3/1994 | Kodosky et al. | 703/2 |
| 5,537,548 A | 7/1996 | Fin et al. | 395/200.04 |
| 5,586,312 A | 12/1996 | Johnson et al. | 707/10 |
| 5,652,909 A | 7/1997 | Kodosky | 717/1 |
| 5,737,622 A | 4/1998 | Rogers et al. | 713/324 |
| 5,757,925 A | 5/1998 | Faybishenko | 709/203 |
| 5,819,093 A | 10/1998 | Davidson et al. | 717/4 |
| 5,870,545 A | 2/1999 | Davis et al. | 709/201 |
| 5,877,757 A | 3/1999 | Baldwin et al. | 345/336 |
| 5,889,942 A | 3/1999 | Orenshteyn | 713/201 |
| 5,944,791 A | 8/1999 | Scherpbier | 709/218 |
| 5,983,268 A | 11/1999 | Freivald et al. | 709/218 |
| 5,999,179 A | 12/1999 | Kekic et al. | 345/349 |
| 6,012,087 A | 1/2000 | Freivald et al. | 709/218 |
| 6,035,332 A * | 3/2000 | Ingrassia et al. | 709/224 |
| 6,108,712 A | 8/2000 | Hayes, Jr. | 709/246 |
| 6,134,568 A | 10/2000 | Tonkin | 707/526 |
| 6,138,155 A | 10/2000 | Davis et al. | 709/224 |
| 6,161,126 A * | 12/2000 | Wies et al. | 709/203 |
| 6,356,933 B2 * | 3/2002 | Mitchell et al. | 709/203 |

FOREIGN PATENT DOCUMENTS

| | | | | |
|---|---|---|---|---|
| EP | 0 475 581 A2 | 3/1992 | | G06F/9/46 |
| WO | WO 97/28623 | 8/1997 | | |
| WO | 0 878 759 A1 | 11/1998 | | G06F/9/46 |

\* cited by examiner

*Primary Examiner*—William C. Vaughn, Jr.
(74) *Attorney, Agent, or Firm*—Lahive & Cockfield LLP; John D. Lanza, Esq.

(57) ABSTRACT

A method for efficiently transferring data between a client and a server includes the steps of: providing an application program; providing an application-independent client process effecting a plurality of client states; providing an application-independent server process effecting a plurality of server states; transferring data from the server process to the client process in response to an application program; and updating at least one client state in response to the transferred data. A related apparatus is also disclosed.

24 Claims, 6 Drawing Sheets

METHODS AND APPARATUS FOR EFFICIENTLY TRANSMITTING INTERACTIVE APPLICATION DATA BETWEEN A CLIENT AND SERVER USING MARKUP LANGUAGE

This is a continuation of prior application Ser. No. 09/391,068, filed on Sep. 7, 1999 now U.S. Pat. No. 6,356,933, the entire disclosure of which is incorporated by reference herein.

FIELD OF THE INVENTION

The present invention relates to client-server networks and, in particular, to methods and apparatus for remotely executing an application and displaying application output.

BACKGROUND OF THE INVENTION

Contemporary computer networks consist of a number of computer systems, called nodes, communicating with other computer systems via communication links. Typically, some of the nodes are client nodes and other nodes are server nodes. A client node formulates and delivers queries to a server node. A user of the client node enters the queries through a user interface operating on the client node. The server node evaluates the queries and delivers responses to the client node for display on the client user interface.

Usually, the server nodes host a variety of application programs or processes that can be accessed and executed by client nodes. When a client node launches an application program, the execution of that application program can occur at either the client node or the server node, depending upon the computing model followed by the computer network.

In a client-based computing model, the application program is packaged and sent down to, or pre-installed on, the client node, allowing the client node to run the application using the resources of the client node. This approach has several drawbacks. First, the client node must have sufficient memory, disk space, and processing power to effectively execute the application. A related problem that occurs using this model is that the number of applications a given client is able to execute is limited due to client resource constraints. Further, applications built this way are complex to develop and maintain and typically require modification or "porting" for all supported client computer system types. Moreover, this technique exacerbates the administration burden on a network administrator.

In a server-based computing model, the server node executes the application program, and only the control information for the client user interface is transmitted across the computer network to the client node for display. Using this approach, user interface events must be sent between the client and the server in order for the server application to process the events. This results in perceived delays of user interface response. Further, the application program must be specifically written, or changed, to support the user interface on the client node. This increases the complexity of the application and prevents this technique from being useful with off-the-shelf applications.

A refinement of the server-based model is to supplant the device driver to which the application communicates in order to send screen and device updates back and forth between the client and the server. This approach avoids requiring applications to be rewritten. However, this approach requires device information to be sent between the client and the server in order to maintain the client display, again introducing perceived latency into the interface. Further, server-side processing requirements are increased in order to satisfy resulting device information required for communication with each connected client.

A recent, further refinement of the server-based model is to deploy the user interface portion of the application as a mark-up language document such as Hyper Text Markup Language (HTML) document. However in using this approach, information sent from the server application to the client begins to "age" immediately. In other words the information may change on the server but the client would not automatically be notified and updated. Further, with this approach interactivity requires context switching between pages even to perform simple tasks.

The present invention avoids these shortcomings.

SUMMARY OF THE INVENTION

The present invention provides a mechanism by which the user interface portion of the application can be delivered to the computer user either on the same machine on which the application is executing or on another machine remote from the machine executing the application. The invention separates the user interface from the underlying application enabling the user interactive portion of the application to be extremely simple. The invention also permits the user interactive portion to be deployed on a wide range of client hardware environments without bringing with it all the required logic for performing the functionality of a particular application. These features give the user the effect of directly interacting with whole application even though the main part of the application is potentially running somewhere else.

Thus, the present invention overcomes many of the problems faced by traditional approaches outlined above. User interface, event handling and screen rendering logic stay on the client, thus dramatically reducing network traffic and latency. The entire user interface and how that interface connects to application components on the server are sent as a pure data description to the client (rather than code). This description is "interpreted" by the client to render the graphics user interface (GUI) and connect to the application (through the transfer of state) running either in the same process space (same machine) or on the server (remote machine).

Because the server can communicate with a particular application client with simply a data description, no additional code needs to be installed on the client machine. An application-independent client process (AICP) reads the description and presents that description to the user as a typical client user interface. Therefore, the AICP can communicate with an unlimited number of server applications with a new data file description for each program (which can be cached automatically as required or as specified by the client). No application specific administration is required for executing an AICP-deployed application using this approach.

With the AICP, no server side processing is required to either render the user interface portion or handle the GUI events portion of the application. The server does, however, coordinate state information being passed to and from the client and sends that information automatically to the appropriate application components involved (both client and server initiated data changes).

Using the AICP, the developer can focus primarily on the functional or business logic portion of the application and let the AICP handle all of the user interface rendering, event handling, and connection of the user interface controls with the underlying application components. A builder component allows the developer to layout the user interface windows as well as create a relationship between the visual control and the underlying application server component with which it is associated. With the AICP no application specific code needs to be sent to the client. Only user interface controls need be sent if required. Even though there is no code on the client, the user's experience with the client application is similar to hand-coded clients found in the client based mode. In one embodiment the AICP is embedded in an HTML browser environment which enables web deployment within an HTML page without the limitation associated with HTML.

The foregoing and other objects, features and advantages of the invention will be apparent from the following more particular description of the embodiments of the invention, as illustrated in the accompanying drawings.

DETAILED DESCRIPTION OF THE INVENTION

Although the method and apparatus of the present invention is described in the context of a web server and web browser process communicating over the Internet, those skilled in the art will recognize that the present invention can also be practiced over any other type of network (e.g., telephone, cable, LAN, WAN, wireless, fiber), within the same physical computer system, or with portions of the invention (e.g. the application independent client process) operating in an Internet appliance or cable TV set-top box. For those individuals who are not familiar with the Internet, the world-wide web, web servers, and web browsers, a brief overview of these concepts is presented here.

Figure 1:
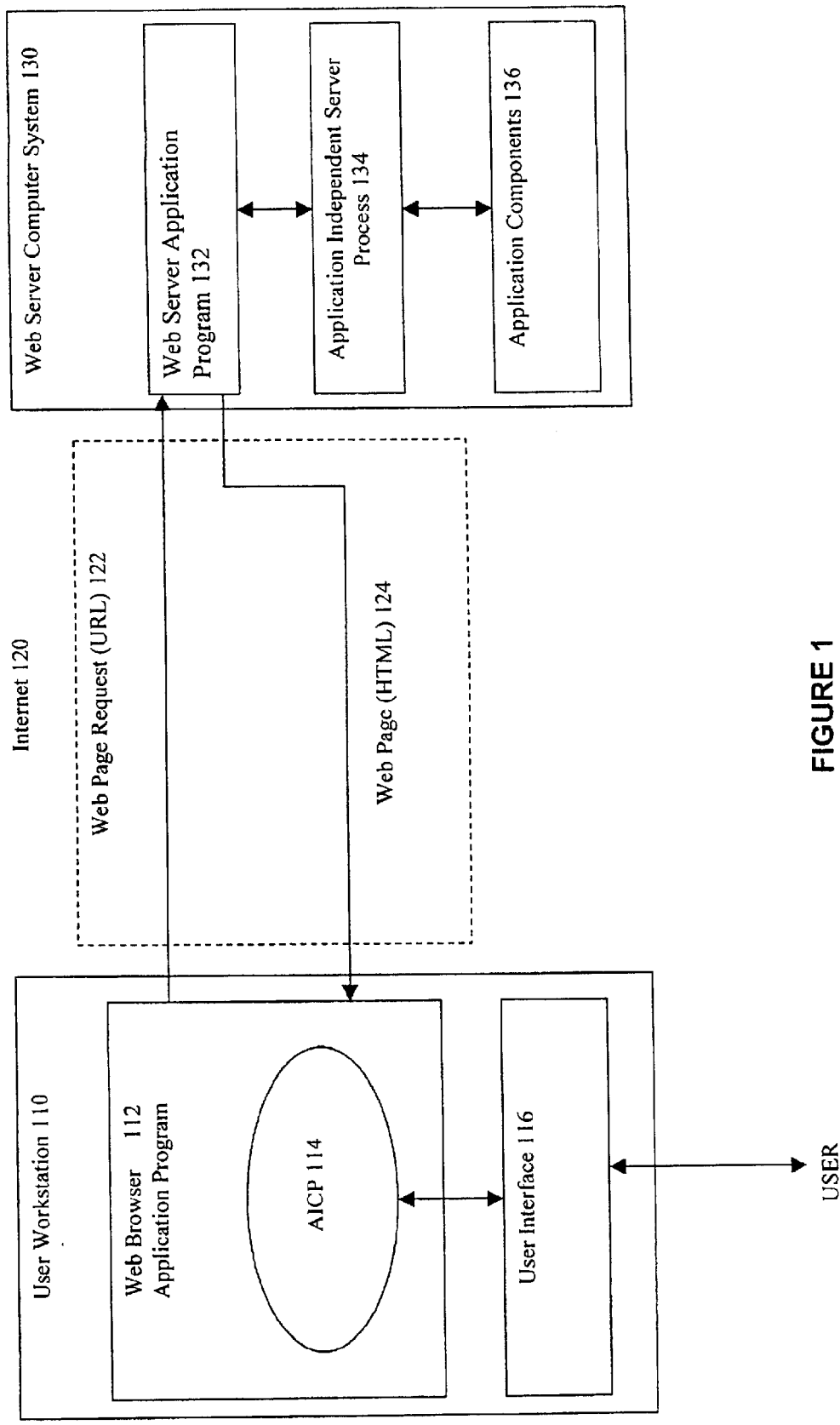
FIG. 1 is a block diagram of an embodiment of the system of the invention.

Referring to FIG. 1, a user that wishes to access information and execute applications on the Internet 120 typically has a computer workstation 110 that executes an application program known as a web browser 112. An application independent client process (AICP) 114, in accordance with the present invention, in one embodiment, is provided as a plug-in to the web browser 112. The user interacts with the web browser 112 and AICP 114 via a user interface 116 that in one embodiment includes a data entry device (e.g., a keyboard) and a visual display device (e.g., a computer monitor). Under the control of web browser 112, the user workstation 110 sends a web page request 122 over the Internet 120. Web page data can be in the form of text, graphics and other forms of information. Each web server computer system 130 on the Internet 120 has a known address (a URL) which the user must supply to the web browser 112 in order to connect to the appropriate web server 130. Because web server 130 can contain more than one web page, the user will also specify in the address which particular web page 124 he or she wants to view on web server 130. The web server computer system 130 executes a web server application program 132, monitors requests, and services requests for which it has responsibility. When a request specifies web server 130, web server application program 132 generally accesses a web page 124 corresponding to the specific web page request 122, and transmits the web page 124 to the user workstation 110. The web page request 122 also includes, in one embodiment, a request to execute an application program on the web server computer system 130. An application independent server process (AISP) 134 receives information contained in this request and responds by executing the desired application program and accessing application components 136 that are needed by the AICP 114.

In general, a web page contains the primary visual data displayed on the user interface 116 of the user workstation 110. When the web server 130 receives a web page request 122, it builds a web page in HTML and transmits it across the Internet 120 to the requesting web browser 112. Web browser 112 interprets the HTML and outputs the web page 124 to the monitor of the user workstation 110. The web page 124 displayed on the user's screen may contain text, graphics, and links (which are addresses of other web pages). These other web pages (i.e., those represented by links) may be on the same or on different web servers. The user can go to these other web pages by clicking on these links using a mouse or other pointing device. This entire system of web pages with links to other web pages on other servers across the world is known as the "World Wide Web".

With the present invention, an interactive graphical user interface is embedded in the web page or may be brought up as a separate dialog from the web page. In one embodiment, the AICP is an ActiveX control embedded in the previously mentioned HTML page. The ActiveX control interprets XML data that is subsequently downloaded in a description file (described below) and renders a graphical user interface. This embedded control is an embodiment of the AICP.

Figure 2:
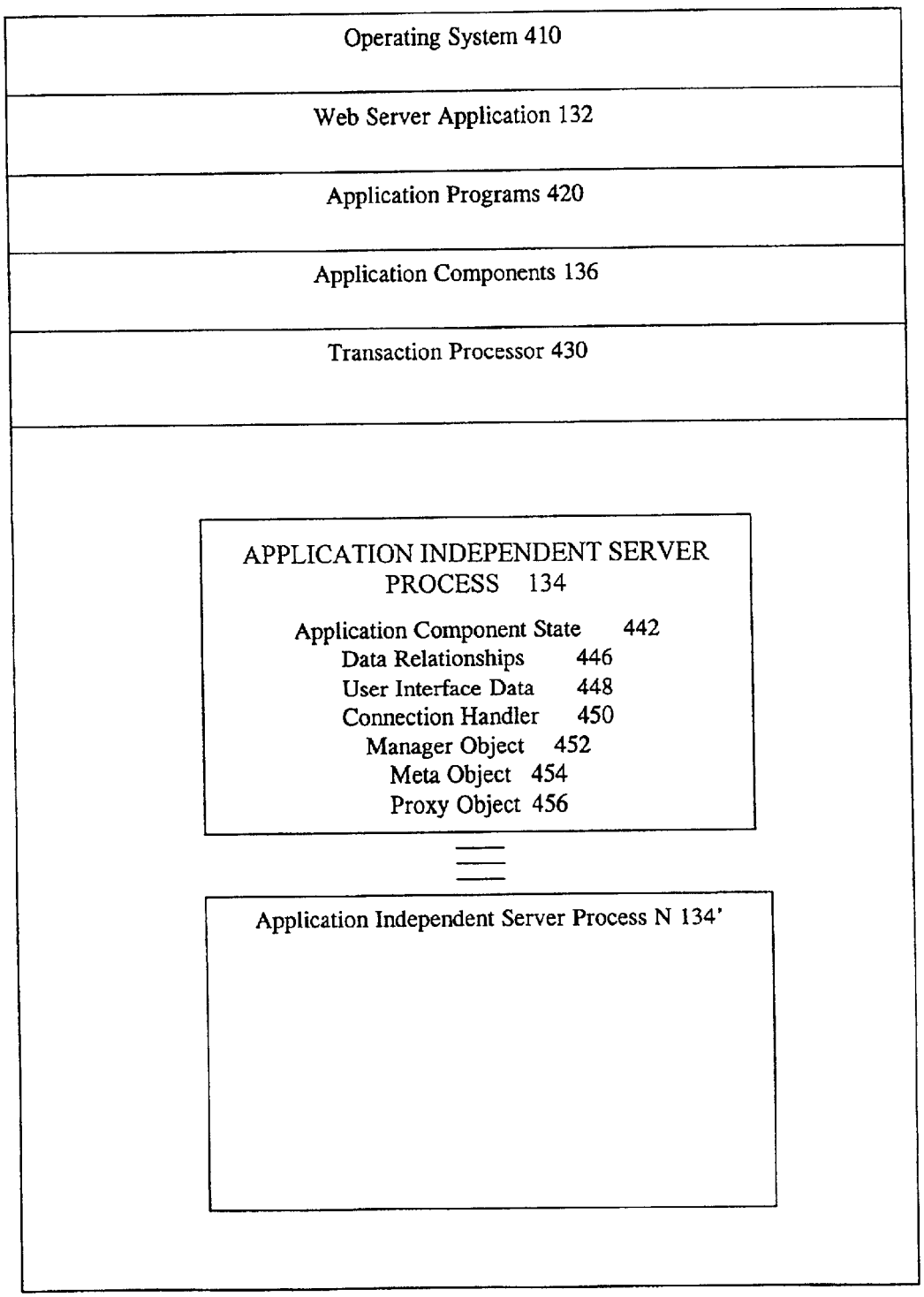
FIG. 2 is a block diagram of an embodiment of the memory configuration of a server constructed in accordance with the invention.

Referring to FIG. 2, located in memory in the server system 130 is an operating system 410, a web server application 132, application programs 420, application components 136, a transaction processor 430, state information, object information, and data (not shown), and one or more instances of an AISP 134.

The application programs 420 are executed by the CPU of the server system 130 under the control of operating system 410. Application programs 420 can be executed using program data as input, such as that received from the AICP 114. Application programs can also output their results as program data in memory.

The transaction processor 430 is a program that receives information from the web server application 132 via a common gateway interface (not shown), interprets the information to determine whether a specific instance of an AISP 134 is required, and launches the instance AISP 134 to further process the request received from the AICP 114.

Figure 3:
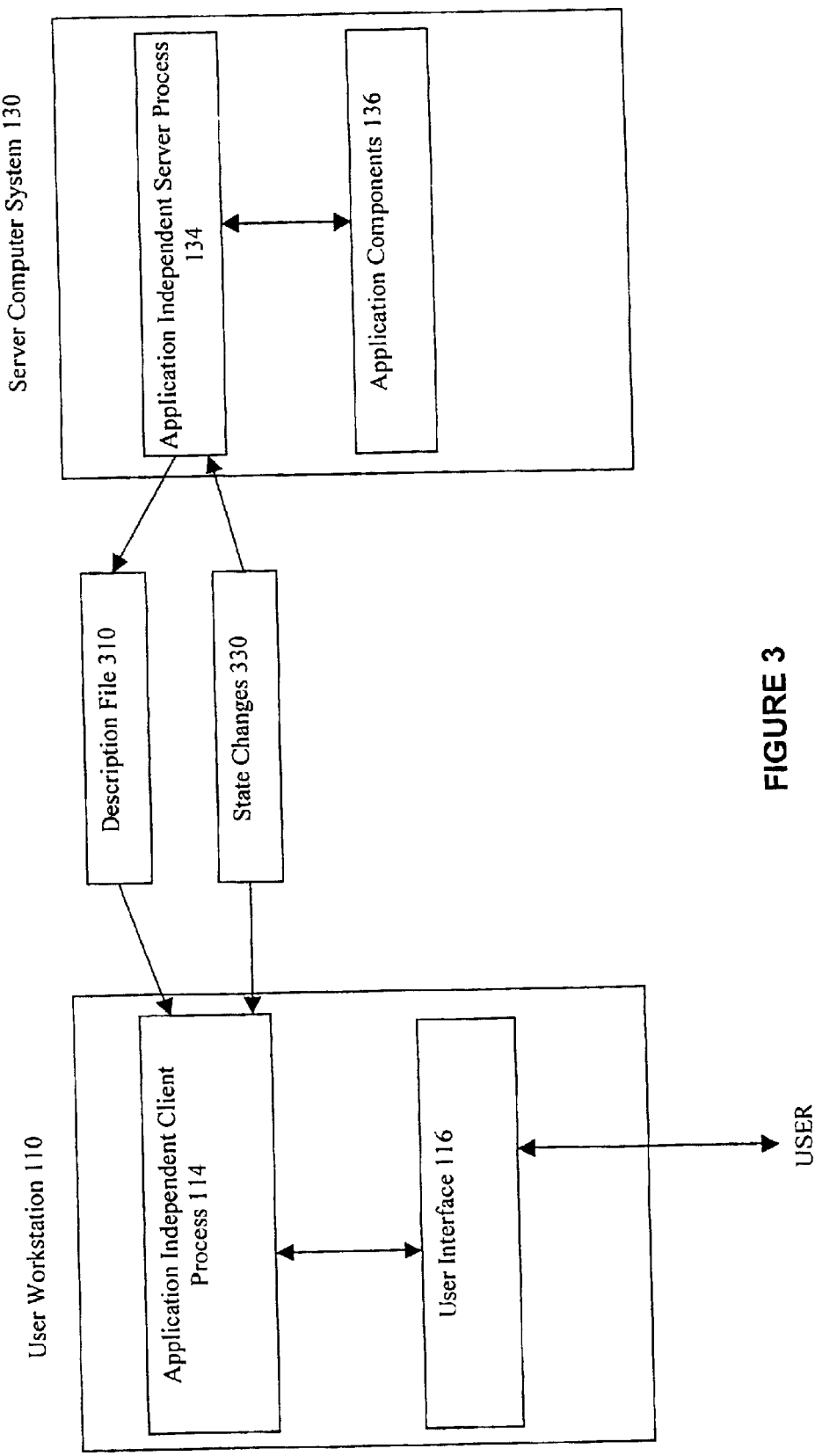
FIG. 3 is an operational block diagram showing an embodiment of the communications between a server and a client node constructed in accordance with the invention.

Referring to FIG. 3, the present invention includes the AICP 114 and the AISP 134. The AICP 114 renders the graphical user interface (GUI) that is displayed to the user on the user interface 116. The AICP 114 also maintains a relationship between the control objects displayed on the user interface 116 and the application components 136 maintained on the web server 130. The AISP 134 tracks the state of the application components 136 along with the control objects displayed on the user workstation 110 that require updates of these application components. Whenever the state changes on either the client (control state) or the server (component state), the AICP 114 and AISP 134 take appropriate action based on the data description that defines the relationship between the GUI controls and the server application components 136 (hereafter referred to as server components) they represent.

Figure 4:
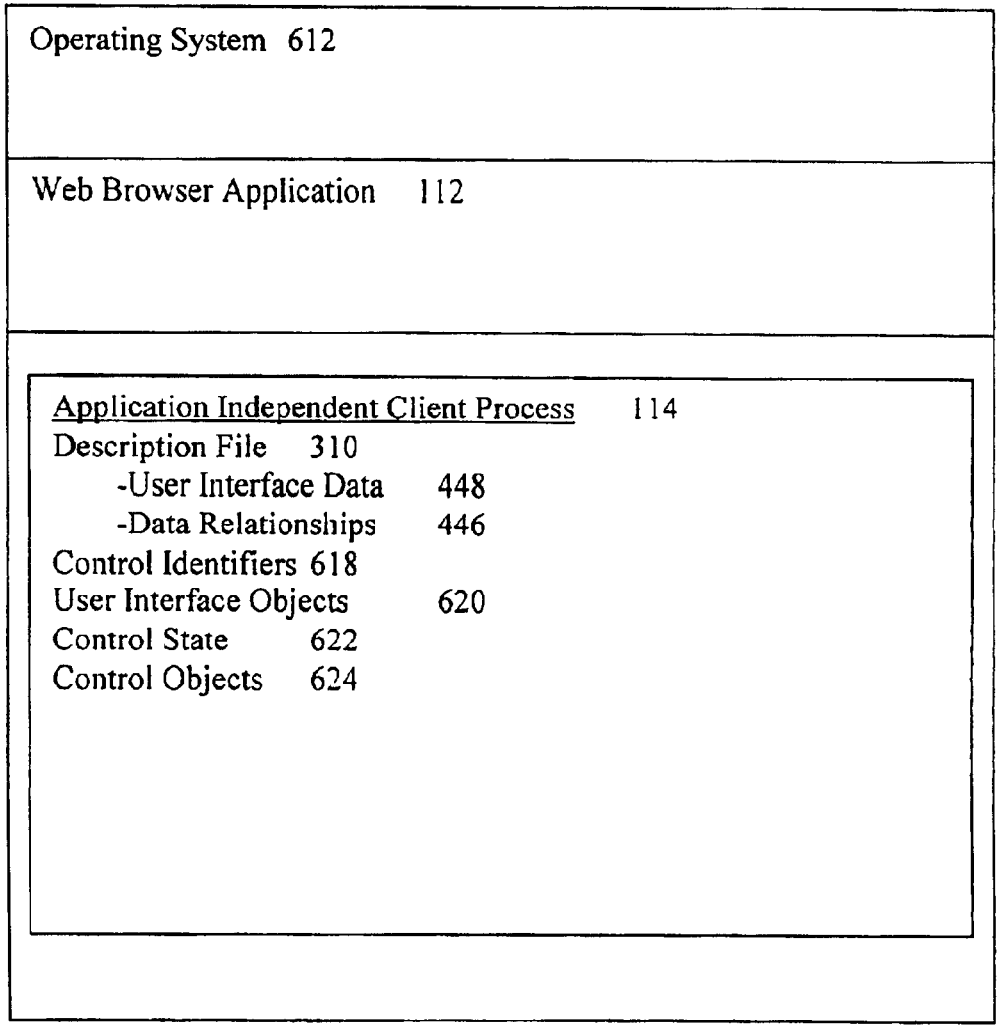
FIG. 4 is a block diagram of an embodiment of the memory configuration of a client constructed in accordance with the invention.

Referring also to FIG. 4, the relationship 446 between the control objects 624 displayed on the user interface 116 of the user workstation 110 and the server components 136 maintained on the web server 130 include data that describes an explicit relationship between their respective object interfaces. This data will hereafter be referred to as a connection. The AICP and AISP contain logic that can interpret connections that relate a visual control to an application component.

For example, a scroll bar control is representative of a type of control object that can be displayed on the user interface 116 of the user workstation 110. The scroll bar control can be associated with the value of an application component, such as the temperature of an industrial process. As the server application detects a temperature change, the state of the Application Components 136 is changed and these state changes 330 are forwarded to the client. The scrollbar is subsequently redrawn by the AICP to reflect the new value. Likewise, if a scroll bar is connected to an Application Component 136 that controls a thermostat, then when the user interacts with the scroll bar on the user interface 116, the state change is transmitted to the Web Server Application Program 132 which would change the state of the appropriate Application Component 136 which would subsequently set the thermostat.

Although this is a simple example, connections can form relationships (e.g., data relationships 446 in FIG. 2) between very complex object types like composite components (components that contain component references) as well as component collections (a list of components). Controls can be tied (connected) to complex components or a composite of controls (commonly referred to as a dialog). The more complex the relationship 446 (FIG. 2) the more verbose the connection information. However, connection information can be packaged as a named entity, which can be referred to in another context so that connection reuse is possible.

A physical connection exists between the AICP 114 and AISP 134. This physical connection can be either network based (server and client being different nodes on a network) or memory based (server and client being on the same computer system). This means that control objects can be connected to server components where they both exist on the same or different physical machines (as well as the same process on the same machine or different processes on different machines).

The connection information can be delineated in a description file in a variety of formats, such as in XML format as discussed below. The XML data also includes the GUI layout description (i.e., user interface data 448 in FIG. 2). Whenever a control object 624 is associated to a server component 136 within a GUI layout (a dialog window), the connection description is included (in context) with the layout information. This is the information the AICP 114 uses to run the application and display the results to the user.

Once a dialog is running via the AICP 114, state changes that occur on either the control objects (control states) or server components (component state 442, FIG. 2) are packaged and sent between the AICP 114 and AISP 134. This is a two-way connection and is asynchronous to minimize interactive latency.

The description file can be in an XML format, which is a convenient format for deployment of data over a network and resembles an attributed file structure, for example as shown in the Appendix. A number of other suitable database formats are also available, such as flat file, SQL, OODB, etc. The XML format consists of name, type, and value pairs, which allow both the AICP 114 and the AISP 134 to traverse and interpret the information in the same file format during runtime. The XML file that is interpreted by the client and AISPs at runtime can be identical. The data contained in the XML file will be interpreted differently by the AICP 114 and AISP 134 in accordance with the different functions that need to be performed on each side of the connection. Although the description file is discussed herein as being located on the same computer systems as the AICP 114 and AISP 134, those skilled in the art will recognize that the description file can be located in any networked location that is accessible by the AICP and AISP.

Referring to FIGS. 2, and 4, the AISP 134 performs the following functions: sends the XML data stream to the AICP 114, reads the description file 310 (FIG. 3) (which can be transmitted as an XML data stream), responds to requests from the AICP 114 to attach to server components 136, maintains a stateful connection, and tracks context on the web server 130. Note that multiple AISPs 134' can exist in the memory of the web server 130 at any given time.

Figure 5:
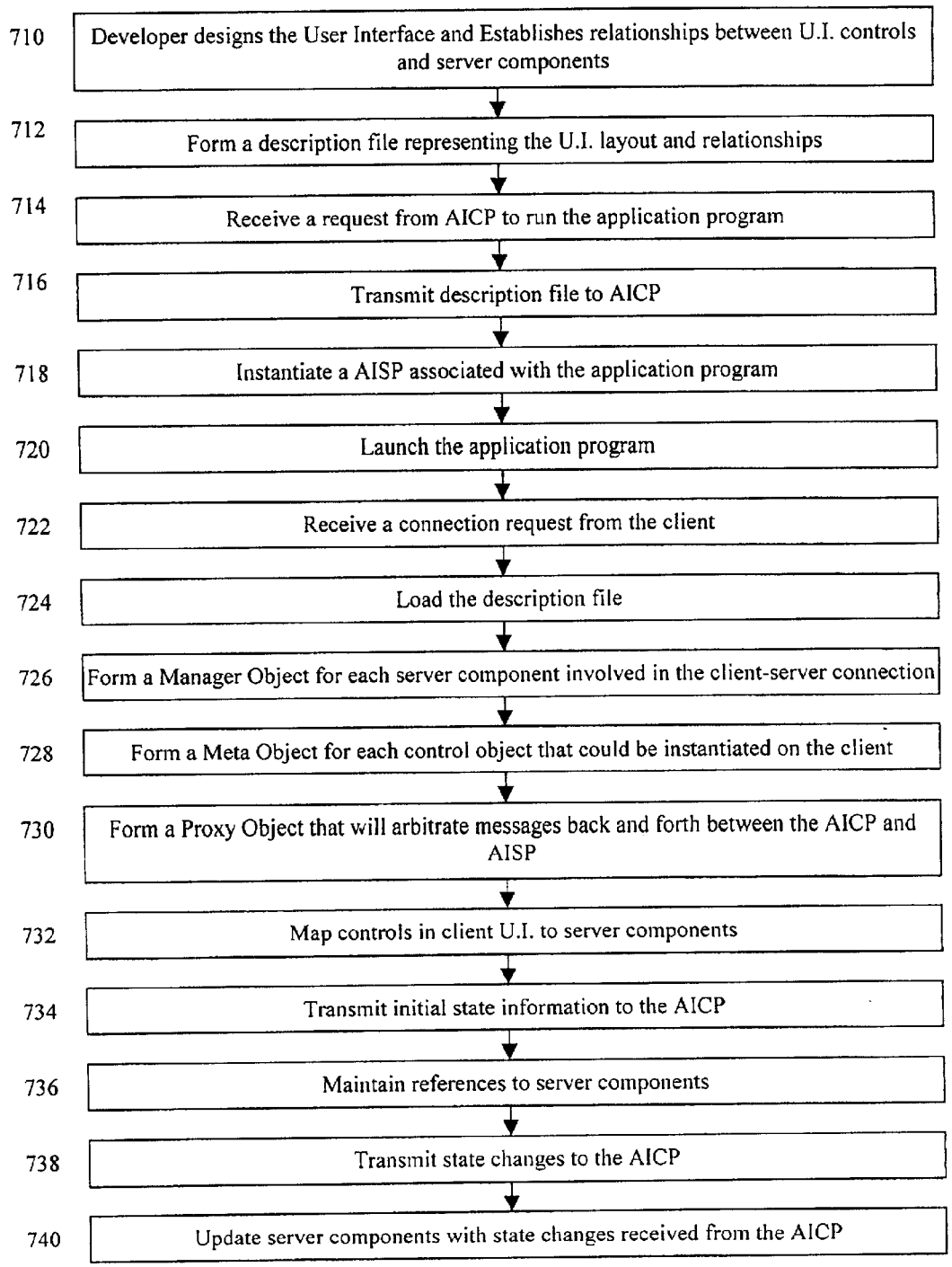
FIG. 5 is a flow diagram of an embodiment of the operation of the server constructed in accordance with the invention.

In use, and referring to FIG. 5, a developer first designs (step 710) the layout of the user interface 116 that will ultimately be displayed on the user workstation 110 and in so doing establishes the relationships between the control objects 624 (FIG. 4) and the server components 136. Once this information is formulated, it is stored (step 712) in a description file 310. When the AICP 114 transmits a request to execute an application program 420 on the web server 130, the transaction processor 430 (FIG. 2) receives (step 714) the request, instantiates (step 718) an AISP 134 associated with the application program 420 if an instance is not already loaded in memory, and launches (step 720) the application program 420. Once the AICP 114 receives the description file 310, it transmits a connection request to the AISP 134. The AISP 134 receives (step 722) the connection request and loads (step 724) the description file 310 associated with the requested application program 420 into server memory.

The description file 310 associated with the requested application program 420 is loaded in order to connect the AICP 114 with the appropriate server components 136. The description file 310 contains sufficient information with respect to the relationships between control objects 624 (FIG. 4) and server components 136 to enable the AISP 134 to manage the server components and the AICP 114 to manage the control objects.

Upon loading the description file 310, the AISP 134 forms (step 726) a manager object 452 for each server component 136 that will likely be involved in that client/server connection. In addition a unique manager object is created (step 728) for each control that could be instantiated on the client (referred to as the Meta object 454) as well. The Meta object 454 stores data such as member information, dialog information, connection information, object-to-object connection information, and a reference to a client manager component in order to effectively connect control objects 624 to server components 136.

Member information includes the properties, functions, and events available on the interface of a control object. This information is used to tell a connection handler 450 how to communicate with particular control objects (as well as server components) involved in the connection during runtime. Dialog information is the GUI layout information that is used by the AICP 114 to render the user interface 116 on the user workstation 110. The dialog information also specifies the type of control object 624 or server component 136 that will be involved in the connection. Connection information describes how a particular control object 624 is associated with a particular server component 136. Object-to-object connection information provides a connection description that enables a client to server component connection and a server component to server component connection. This allows server components to communicate with each other without knowing any specific details of the objects they are connected to.

The client manager component provides a standard interface allowing the AISP 134 to talk to the back end application program 420. The client manager is a component interface that must be implemented by the server application program 420 in order to initialize the behavior of the AICP 114. The client manager component interface, in one embodiment, includes 4 functions: ClientCanConnect( ), ClientCanDisconnect( ), ClientConnected( ), ClientDisconnected( ). These functions are called whenever a new AICP 114 wants to connect or disconnect an application program 420 on the web server 130.

When a dialog is created in the AICP 114, the AISP 134 is notified that it must create a physical attachment to the relevant instance of the server component 136 on the server 130. In order to establish this physical attachment, the AISP 134 maps (step 732) the object controls in the user interface 116 to server components 136. The dialog description of the server component 136 can be found in the Meta object 454. At this point the AISP 134 obtains the name of the dialog that is to be created on the AICP 114 and receives access to an instance of server component 136. A connection handler 450 is instantiated for each control that requires connection to a part of the server component instance. The connection handler 450 initializes and maintains the connection between the control object 624 and server component 136. Only connection handlers 450 that are marked as "run on the server" would be created at this point. If they were marked as "run on the client" then the AICP 114 would have already created one. The connection handler 450 is assigned an identifier 618 (FIG. 4) that is identical to that provided for the control object 624 of the AICP 114. This identifier 618 is used to synchronize the information messages going back and forth between the AICP 114 and the AISP 134.

Similar to the dialog object described in the AICP section, the server forms (step 730) a client-side proxy object 456 that arbitrates messages sent between the client side of the server connection and the AICP 114. The connection handler 450 communicates with this proxy object 456 as if it were the control object 624 itself. The proxy object 456 transmits a value for the control object 624 to the AICP 114 which in turn will modify the control object 624 on the user interface 116. In this manner, the proxy object 456 can transmit initial state information to the AICP 114 (step 734) as well as updating the AICP 114 with state changes 330 of a particular server component 136 on the server 130 (step 738).

Similarly, when the control state 622 of a control object 624 on the AICP 114 changes, the modified control state is sent to the AISP (using the control identifier 618 assigned to that particular control object 624) via the proxy object 456. Once the modified control state had been received by the proxy object 456, the proxy object 456 notifies the connection handler 450 that the state of the control object has changed so that the modified state can be incorporated into the appropriate server component 136.

Similar to the AICP 114, the AISP 134 maintains (step 736) the connection for the duration of the dialog. When the dialog is closed by the user, or via some other fashion (e.g., a notification by a server component to close all connected dialogs), the AISP 134 removes and deletes each of the connection handlers 450 associated with the connection to the dialog. In addition, the proxy objects 456 used to communicate on behalf of the control objects 624 are discarded as well.

The AISP 134 uses a component manager (not shown) to maintain a list of components involved in client side connections. The component manager keeps track of all the dialogs that are actively attached to server components for the duration of the dialog. Each time a dialog is created on an AICP 114, a reference to the dialog is added to the list maintained by the component manager. This reference identifies all of the server side connection handlers, which in turn reference control proxies involved in a connection. When a dialog is closed, the AISP 134 refers to this list to lookup the dialog connection information and removes the dialog reference from the list.

Although the AICP 114 and AISP 134 perform different roles, much of their respective code is identical. The key to making both the AICP and AISP nearly identical is in providing a standard object interface that connects control objects 624 on the AICP 114 and server components 136 on the AISP 134. The interpreter logic of the application independent processes can connect each respective side (client or server) in exactly the same way (through a standard object interface). The fact that the control object is visual is just a side affect of the implementation of the object. Therefore, the present invention can be applied to a number of implementations that do not require a visual presentation.

Referring again to FIG. 4, the AICP 114 can reside in the memory of the user workstation 110. The memory also holds the operating system 612 installed on the user workstation 110 and the web browser application program 112 within which the AICP 114 is launched. The AICP 114 performs the following functions: reads the data description file 310, renders the user interface 116, attaches connected controls, maintains a stateful connection, and tracks the context on the client.

Figure 6:
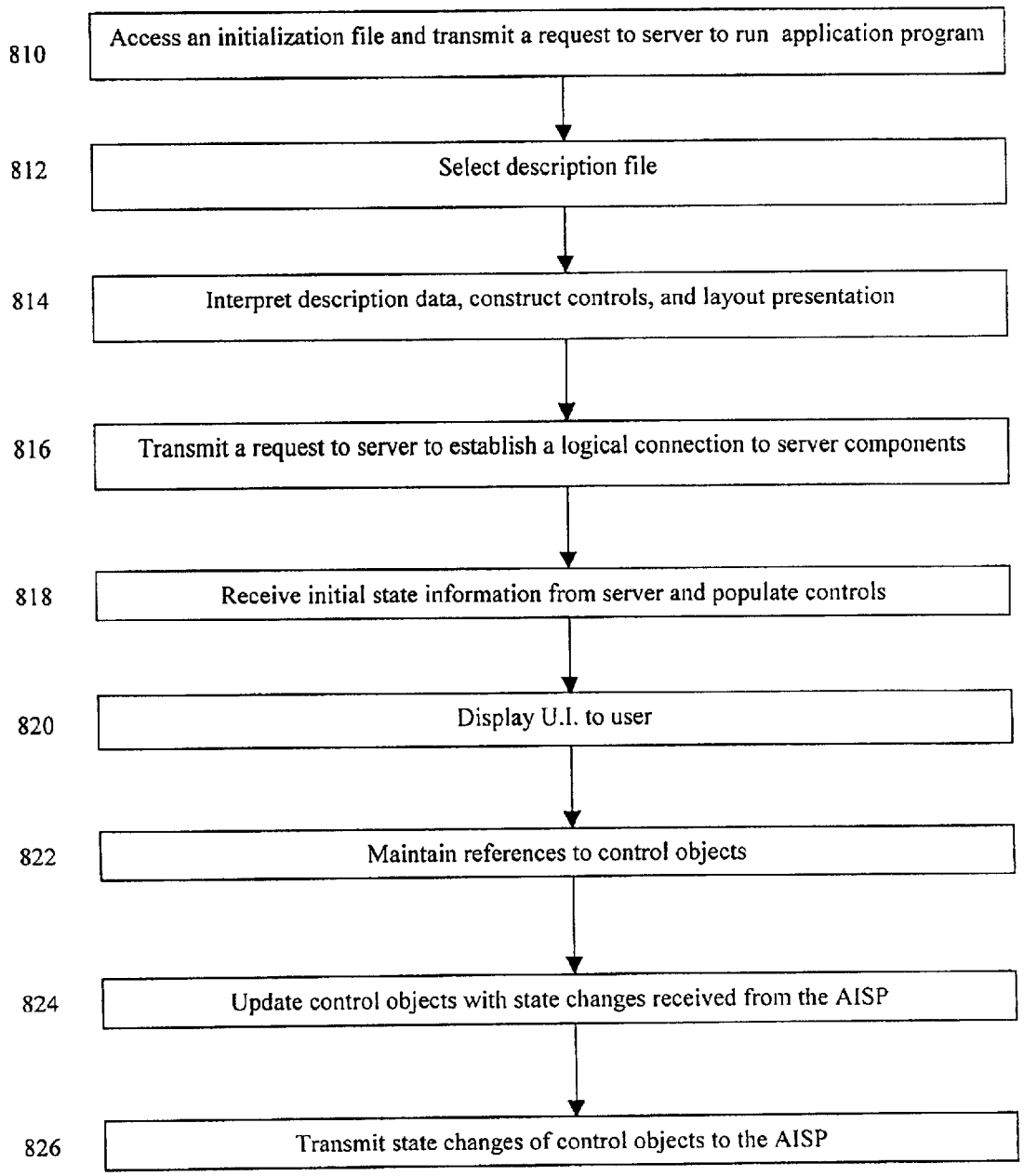
FIG. 6 is a flow diagram of an embodiment of the operation of the client node constructed in accordance with the invention.

Referring also to FIG. 6, the AICP 114 is first installed on the user workstation 110. The most common installation method is to manually install the AICP 114 through the system install procedure (e.g., in the Microsoft Windows operating system, using the "Add/Remove Programs" function). Alternatively, the AICP 114 can be automatically installed through a web based plug-in protocol.

Because there is no code on the client that represents the application program 420, the AICP 114 supports a number of approaches in establishing the initial connection to the server side application program 420. The information required by the AICP 114 to interact with the application program 420 includes: the name of the server process to execute, the location of the description file 310 on a network server, any initial arguments that must be communicated to the application program 420 when connected, and the current version of the description file. This information can be contained in an initialization file that is loaded when the AICP 114 is launched.

When the AICP 114 is started, it will access (step 810) the initialization file and, using the information contained therein, will transmit a request to the server 134 to run the desired application program 420. As previously discussed, the transaction processor 430 on the server 130 sends a description file 310 to the AICP 114 which then compares the version stamp of the description file received to that contained in the local memory 610 of the user workstation 110 (obtained from a prior transaction or during installation of the AICP 114). The AICP 114 can then determine (step 812) which version of the description file 310 to load. By default, the AICP 114 only downloads the description file 310 from the transaction processor 430 if the version stamp of the file on the server is later than a cached file already resident on the client. The description file 310 is peculiar to a specific application program 420.

Once downloaded (or loaded locally from a file cache), the description file 310 provides the AICP 114 with the dialog description of the application program 420. The AICP 114 then proceeds to interpret (step 814) the description data of that dialog in order to construct the control objects 624 that exist within the dialog and lay out the control objects 624 onto the user interface 116 for presentation to the user.

Meanwhile, the AICP 114 transmits a request (step 816) to the AISP 134 to establish a logical connection to the server components 136. Upon successfully connecting to the server components 136 on the server 130, the AICP 114 receives (step 818) and subsequently populates the dialog control objects 624 with control state information 622 corresponding to the server component state 442.

State changes for a particular visual context (e.g., a dialog) are sent to the AICP 114 as one logical packet for optimization reasons, although the structure of the state change packet is identical regardless if a single state change or a plurality of state changes occurred. At this point, the control objects 624 are actively connected to the server components 136 so that state changes on either side are reflected in the other. Once the control objects 624 reflect the current server component state 442, the dialog is then displayed (step 820) to the user via the user interface 116.

Control objects 624 are associated with the server components 136 by a reference property that is provided as part of the description of the control object 624, which is included in the overall dialog layout description. This reference can be the name assigned to the connection description and the type of the associated server component 136. A unique control identifier 618 is computed for each of the control objects 624 that are connected to server components 136. This control identifier 618 is used to coordinate state changes 330 with the AISP 134 when connecting to the appropriate server component instance that is assigned to that control object 624. Note that many control objects can be tied to the same server component 136

Since the AICP 114 and the AISP 134 are largely identical processes, some of the connections can reside on the client. At times, it is useful to instantiate the connection logic that binds a client's control object 624 to a server's application component 136 on either the AICP 114 or the AISP 134. The selection of where to instantiate the connection logic depends on the volume of information flow coming into each side of the connection. For example, if the load is heaviest on the client side, then it is better to instantiate the connection handler on the client. In this way, bandwidth utilization can be tailored based on the kind of connection and the client and server components involved.

For as long as a dialog is displayed on a particular AICP 114, the connection handlers 450 maintain (step 822) a real time stateful connection to the associated server components 136. The connection handler 450 responds to state changes 330 on either the client control object 624 or on its associated server component 136. The connection handler 450 is also able to transform the data based on a set of rules defined by the developer. The connection handler 450 is able to maintain state on each side of the connection by maintaining (step 822) references to the control objects 624 involved in the connection.

The connection handler 450 also maintains a stateful connection whenever a member of a complex component changes. This happens when a property (which is a member of a complex component which can hold a value of a particular type or be empty) of a complex control is assigned a new value (which itself can be a complex or simple component). When the connection handler 450 detects a property change, it executes the appropriate connection transformation. In addition, if a control object 624 was attached to that property it would not be connected to the new value. The connection handler involved would remove the reference to the old value and create a reference to the newly assigned value (of the property). In this manner, the control objects 624 are updated (step 824) with state changes 330 that are received from the AISP 134 and the state changes occurring in a control object 624 are transmitted (step 826) to the AISP 134 in order to update the appropriate server components 136.

A GUI application involves several relationships that describe the user access to the underlying application. For example, a dialog can contain a button (which is an example of a control object), that when selected will popup another dialog. It is important for the AICP 114 and AISP 134 to actively maintain this context with the server components 136. A popup dialog usually represents a complex property member of a complex component. Another popup scenario is when the popup dialog provides an argument to a function that is a member of a complex component. These data relationships 446 represent application context that is tracked by the AIP, thereby freeing the developer from having to explicitly create and maintain them.

The AICP 114 creates a container object for each dialog that is created on the user workstation 110. This container object tracks the duration of the dialog with respect to the server component 136. The container object detects when the dialog is closed by the user and takes appropriate action for closing down the connection handlers 450 associated with the control objects 624 within the dialog. The container object also coordinates processing of state change messages that flow between the AICP 114 and the AISP 134. Whenever the container object receives a state change 330 from the AISP 134, it extracts the control identifier 618 contained in the message, locates the control objects 624 associated with that control identifier 618, and uses the component interface of the control object 624 to effect the state change directly on the control object 624. Likewise when the control object 624 changes state, the container object is notified of the change, packages up the state change message, and sends it to the AISP 134.

The container object sends state changes to the AISP 134 for the parts of the control object's interface in which the connection handler 450 is interested. The connection handler 450 is interested in the control members delineated in the description file 310 that were used to create the connection handler 450. The container object that wraps the dialog also creates an object container for each control object 624 instantiated within the dialog in order to maintain its stateful lifetime.

Both the AICP 114 and AISP 134 have container objects that manage the state of the components to which they are connected. These containers track the state of the objects as well as the application context in which these objects reside. The application context refers to the manner in which objects are referenced by the AICP 114 and the AISP 134. For example, when a dialog is connected to a server component 136, the AICP 114 creates a container for the dialog and the AISP 134 creates a container for the server component 136. When the user closes the dialog, the client container detects this action and notifies the server container. Each container can then take appropriate action based on the type of operation. The nature of the containers are hierarchical in that each container can hold other containers based on the complexity of the objects involved in a particular connection.

There are two types of client containers—a dialog container and a control container. The dialog container manages the life of the dialog and the control container manages the flow of state information to the individual control. These containers enable the attachment of the user interface elements to server side objects as well as maintain the state integrity during the life of the connection.

The dialog container is an object that is created for each window displayed on the user interface 116. The dialog container is created in accordance with the XML description in the description file 310. The dialog container processes the XML description and creates the dialog layout as well as the control objects contained within the description. In addition, the dialog container creates a control container for any controls that are connected to data on the server. Controls that are created for display purposes only do not need a control container (for example, a label or bitmap decoration).

The dialog container supports several functions, including: rendering the window itself, creating the control containers as needed, notifying the AISP 134 when the dialog is closed and deleting subordinate control container objects, and closing child dialogs that depend from parent dialogs as appropriate.

The control container is created for each control object 624 that is tied to data. The control container computes and holds a unique control identifier 618 that is used to send messages to the AISP 134 and to access the appropriate server components 136. When the AISP 134 initially transmits state data to the AICP 114, the control container sets the state on the control object 624 during initialization. The control container also receives state change messages during the connection life of the control object 624 and updates the control object 624 in accordance therewith. When the state of the control object 624 changes, the control container detects the change and sends a state change message to the appropriate server element via the AISP 134 (using the control identifier 618 and an identifier of the AISP instance). It is noteworthy that only the control container processes the state changes that are involved in a connection description and that most state changes on the control object 624 do not involve the connection, thus reducing unnecessary network traffic.

In addition to the control containers, there are two kinds of server containers—component containers and member containers. For as long as the client dialog is open, the server component container maintains a reference to the underlying component instance that the client is connected to. The member container manages the flow of state information on the individual member of the component (similar to function and property). These containers enable the attachment of the user interface elements to client side control objects as well as maintain the state integrity during the life of the connection.

A component container is created by the AISP 134 for each server component 136 that is connected to a client dialog. The component container adds a reference count to the server component 136 so that it will not be lost during the life of the remote client dialog. For each member of the server component 136 that is involved in a connection to a control object 624, a member container object is created which will be responsible for maintaining the member's state during the life of the connection. When the dialog is closed on the client, the component container destroys all the child member containers that were used to maintain that dialog's connection on the server.

A member container is created for each member of a server component 136 that is involved in a connection to a control object 624. The member container computes and stores a unique control identifier that is used to send messages to the AICP 114 in order to access the correct control object 624. The member container also sends initial state information to the control object 624 during the initialization of the dialog. Further, the member container receives data change message from the AICP 114 and updates the appropriate member of the server component 136 in accordance therewith.

Whenever the state of the component member changes, the member container detects the change and subsequently sends a message, containing the state change information, to the appropriate control object 624 (using the control identifier 618 and the server instance identifier). It is noteworthy that only the member container processes the state changes that are involved in connection description and that most of the state changes on the server are not involved in a connection, thus reducing unnecessary network traffic.

One of the capabilities of the AIP invention is its ability to allow multiple AICPs to attach to the same AISP. The first time that a client requests a connection to a server, an AISP assigned to the application will be instantiated. The AISP in turn instantiates the client manager object for that application. At any time, another client can request to attach to the same application instance on the server. Instead of instantiating another AISP for that application, the same AISP instance will be used (as well as the client manager that was created for it). If two clients are then accessing the same server component instance on the server, they will be able to interact and access the same state. This allows real time collaborative access to shared state that is not easily provided with traditional forms of client deployment.

With collaboration deployment, a list of dialogs running on a particular client is associated with a client manager object that resides on the server. A list of client managers resides within the AISP (that reflects the current number of active clients attached to the same server application). Even though many clients can see the same information on the server they do not always have to view exactly the same components in the same way. The client manager can direct different clients to have different dialog representations of the same server components. Also, based on the client user's navigation through their own dialog instances, each client user may see dramatically different information at any given time.

The present invention may be provided as one or more computer-readable programs embodied on or in one or more articles of manufacture. The article of manufacture may be a floppy disk, a hard disk, a CD ROM, a flash memory card, a PROM, a RAM, a ROM, or a magnetic tape. In general, the computer-readable programs may be implemented in any programming language. Some examples of languages that can be used include C, C++, or JAVA. The software programs may be stored on or in one or more articles of manufacture as object code.

While the invention has been particularly shown and described with reference to several exemplary embodiments thereof, it will be understood by those skilled in the art that various changes in form and detail may be made therein without departing from the spirit and scope of the invention.

APPENDIX

```
<tbl>{
    <tbl n="Version">{
        <s n="Major">3</s>
        <s n="Minor">2</s>
    }</tbl>
    <tbl n="Project">{
        <a n="Name">"PatentInt"</a>
        <i n="Project Type">0</i>
        <a n="EosFramework">""</a>
        <i n="App Type">0</i>
        <e n="Default Layout" t="Default Layout">1</e>
        <e n="Default Deployment" t="EosProjectGalleryType">0</e>
        <l n="Project Element Count">2</l>
        <str n="Java Package Name"></str>
        <e n="Java Error Message Level" t="EosJavaErrorMsgLevel">2</e>
        <b n="Using Legacy Database">F</b>
        <b n="Project Modified">T</b>
        <b n="Main Dialog In Web Browser">T</b>
        <a n="App CoClassID">"{31A04CC4-3ECA-11D3-AA64-00A0C98C85AF}"</a>
        <a n="App IID">"{31A04CC5-3ECA-11D3-AA64-00A0C98C85AF}"</a>
        <b n="Single Instance Application">T</b>
        <b n="Exit On Last Client Disconnect">T</b>
        <tbl n="Player">{
            <str n="List Picture">"CitrixDefBitmap.bmp"</str>
            <str n="Application Info String">"temp183_ComFramework Application"</str>
            <str n="Application Name">"temp183_ComFramework"</str>
        } </tbl>
        <str n="Company Name">"Project1 Company, Inc."</str>
        <str n="Product Name">"Project1"</str>
        <str n="Product Version">"0.0"</str>
        <str n="Copyright Message">"Copyright © 1999 Project1 Company, Inc. All Rights
Reserved. "</str>
        <i n="Environment">1</i>
        <b n="Project Access">F</b>
        <b n="Enable Secure Communications">F</b>
        <b n="Extension Metadata">F</b>
        <tbl n="Client Connection Defaults">{
            <tbl n="Initial Dialog">{
                <tbl n="Dialog Properties">{
                    <i n="Initially Hidden">0</i>
                    <i n="Quit On Exit">0</i>
                    <i n="Dialog Modality">2</i>
                }</tbl>
            }</tbl>
        }</tbl>
    }</tbl>
    <tbl n="Types List">{
        <tbl n="PatentIntObject^IntObject">{
            <str n="Name">"PatentIntObject^IntObject"</str>
            <a n="Super Class">"EosComProxy"</a>
            <l n="ID">1</l>
            <b n="Dirty">T</b>
            <b n="New Class">T</b>
            <tbl n="Property List">{
                <str n="COM Type Lib">"PatentIntObject"</str>
                <a n="COM Default Field">""</a>
                <str n="COM Default Name">"_IntObject"</str>
                <str n="COM Default">"{44A4DF21-5EDF-11D3-99EE-00A0C98C852D}"</str>
                <str n="COM Default Source"></str>
            <str n="COM Default Source Name"></str>
            <str n="COM Help File"></str>
            <ul n="COM Help Context">0</ul>
            <str n="COM CoClass">"{44A4DF22-5EDF-11D3-99EE-00A0C98C852D}"</str>
            <str n="COM CoClass ProgID">"PatentIntObject.IntObject"</str>
            <seq n="COM Co-Class Interface List">[
```

APPENDIX-continued

```
                <str>"{44A4DF21-5EDF-11D3-99EE-00A0C98C852D}"</str>
                <str>"{9FE7AAE0-EDD9-11D2-9C9F-00104B9CD34A}"</str> ]</seq>
            <b n="Is Bound">T</b>
        }</tbl>
<e n="EosStructType" t="EosStructType">1</e>
<str n="Header File">"PatentIntObject_IntObject"</str>
<str n="Implementation File">"PatentIntObject_IntObject"</str>
<str n="Last HPP Generated"></str>
<str n="Last CPP Generated"></str>
<a n="Last Class Generated">""</a>
<tbl n="Fields">{
    <tbl n="intProperty">{
        <a n="Name">"intProperty"</a>
        <a n="class">"PatentIntObject_IntObject"</a>
        <tbl n="Property List">{
            <b n="Is Bound">T</b>
            <l n="COM Dispatch ID">1745027072</l>
            <tbl n="Property Funcs Info">{
                <tbl n="PUT Func">{
                    <s n="COM InvokeKind">4</s>
                    <us n="COM FuncFlags">0</us>
                    <i n="COM FuncKind">4</i>
                    <s n="Func Offset">40</s>
                }</tbl>
                <tbl n="GET Func">{
                    <s n="COM InvokeKind">2</s>
                    <us n="COM FuncFlags">0</us>
                    <i n="COM FuncKind">4</i>
                    <s n="Func Offset">44</s>
                }</tbl>
            }</tbl>
            <i n="COM VarType">2</i>
            <a n="COM TypeName">"EosNum<short>"</a>
            <ul n="COM Help Context">0</ul>
        }</tbl>
        <l n="ID">2</l>
        <a n="eos_type">"EosNum<short>"</a>
    }</tbl>
}</tbl>
<tbl n="Views">{
    <tbl n="MFC Dialog">{
        <a n="Interactor Name">"MFC Dialog"</a>
        <a n="Constructor">"EosEmbeddedView"</a>
        <tbl n="Local Descriptor">{
            <seq n="View Children">[ <tbl>{
                <e n="EosViewType" t="EosViewType">0</e>
                <a n="Interactor Name">"Box"</a>
                <str n="Caption">"Untitled"</str>
                <e n="EosInteractorType" t="EosInteractorType">0</e>
                <b n="Margin (Internal)">T</b>
                <seq n="View Children">[ <tbl>{
                    <e n="EosViewType" t="EosViewType">2</e>
                    <a n="Interactor Name">"ActiveX Numeric
                    VScrollBar"</a>
                    <str n="Caption">"intProperty"</str>
                    <e n="EosInteractorType" t="EosInteractorType">0</e>
                    <e n="EosStructType" t="EosStructType">0</e>
                    <a n="Data Type">"EosNum<short>"</a>
                    <a n="Field Name">"intProperty"</a>
                    <a n="Editor Name">""</a>
                    <s n="Tab Order">2</s>
                    <a n="(Name)">"ScrollBar1"</a>
                    <tbl n="AxCtrlProps">{
                        <str n="Size">"423;4815"</str>
                    }</tbl>
                    <l n="Default Min Y">100</l>
                    <l n="Default Max Y">1600</l>
                    <l n="Margin X">0</l>
                    <l n="Margin Y">0</l>
                    <l n="Size In X">16</l>
                    <b n="Can Stretch In X">F</b>
                }</tbl> <tbl>{
                    <e n="EosViewType" t="EosViewType">2</e>
                    <a n="Interactor Name">"ActiveX Numeric TextBox"</a>
                    <str n="Caption">"intProperty"</str>
                    <e n="EosInteractorType" t="EosInteractorType">0</e>
                    <e n="EosStructType" t="EosStructType">0</e>
                    <a n="Data Type">"EosNum<short>"</a>
                    <a n="Field Name">"intProperty"</a>
```

APPENDIX-continued

```
<a n="Editor Name">""</a>
<s n="Tab Order">3</s>
<a n="(Name)">"TextBox1"</a>
<tbl n="AxCtrlProps">{
    <ul n="VariousPropertyBits">746604571</ul>
    <str n="Size">"2990;556"</str>
    <str n="Value">"intProperty"</str>
    <ul n="FontHeight">165</ul>
    <uc n="FontCharSet">0</uc>
    <uc n="FontPitchAndFamily">2</uc>
}</tbl>
<l n="Default Min X">15</l>
<l n="Default Min Y">1</l>
<l n="Default Max X">300</l>
<l n="Default Max Y">1</l>
<l n="Margin Y">8</l>
<e n="Size" t="EosSizeType">1</e>
}</tbl> <tbl>{
    <e n="EosViewType" t="EosViewType">0</e>
    <a n="Interactor Name">"Box"</a>
    <str n="Caption">"Untitled"</str>
    <e n="EosInteractorType" t="EosInteractorType">0</e>
    <b n="Margin (Internal)">T</b>
    <seq n="View Children">[ <tbl>{
        <e n="EosViewType" t="EosViewType">2</e>
        <a n="Interactor Name">"ActiveX Function
            Button"</a>
        <str n="Caption">"OK"</str>
        <e n="EosInteractorType"
            t="EosInteractorType">0</e>
        <e n="EosStructType" t="EosStructType">0</e>
        <a n="Data Type">"EosFunction"</a>
        <a n="Field Name">"okView"</a>
        <a n="Editor Name">"EosFunctionEditor"</a>
        <l n="Environment Object Id">0</l>
        <s n="Tab Order">0</s>
        <seq n="Mapper Children">[ <tbl>{
        <tbl n="Dialog Properties">{
            <i n="Dialog Modality">2</i>
            }</tbl>
        }</tbl> ]</seq>
    <a n="(Name)">"CommandButton1"</a>
    <tbl n="AxCtrlProps">{
        <str n="Caption">"OK"</str>
        <str n="Size">"2593;661"</str>
        <ul n="FontHeight">165</ul>
        <uc n="FontCharSet">0</uc>
        <uc n="FontPitchAndFamily">2</uc>
        <uc n="ParagraphAlign">3</uc>
    }</tbl>
    <l n="Default Min X">18</l>
    <l n="Default Min Y">1</l>
    <l n="Default Max X">18</l>
    <l n="Default Max Y">1</l>
    <l n="Margin X">8</l>
    <l n="Margin Y">12</l>
    <e n="Size "t="EosSizeType">1</e>
}</tbl> <tbl>{
    <e n="EosViewType" t="EosViewType">2</e>
    <a n="Interactor Name">"ActiveX Function
        Button"</a>
    <str n="Caption">"Cancel"</str>
    <e n="EosInteractorType"
        t="EosInteractorType">0</e>
    <e n="EosStructType" t="EosStructType">0</e>
    <a n="Data Type">"EosFunction"</a>
    <a n="Field Name">"cancelView"</a>
    <a n="Editor Name">"EosFunctionEditor"</a>
    <l n="Environment Object Id">0</l>
    <s n="Tab Order">1</s>
    <seq n="Mapper Children">[ <tbl>{
        <tbl n="Dialog Properties">{
            <i n="Dialog Modality">2</i>
            }</tbl>
        }</tbl> ]</seq>
    <a n="(Name)">"CommandButton2"</a>
    <tbl n="AxCtrlProps">{
        <str n="Caption">"Cancel"</str>
        <str n="Size">"2593;661"</str>
```

APPENDIX-continued

```
                            <ul n="FontHeight">165</ul>
                            <uc n="FontCharSet">0</uc>
                            <uc n="FontPitchAndFamily">2</uc>
                            <uc n="ParagraphAlign">3</uc>
                        }</tbl>
                        <l n="Default Min X">18</l>
                        <l n="Default Min Y">1</l>
                        <l n="Default Max X">18</l>
                        <l n="Default Max Y">1</l>
                        <l n="Margin X">8</l>
                        <l n="Margin Y">12</l>
                        <e n="Size" t="EosSizeType">1</e>
                    }</tbl> <tbl>{
                        <e n="EosViewType" t="EosViewType">1</e>
                        <a n="Interactor Name">"Spacing"</a>
                        <str n="Caption">"Untitled"</str>
                        <e n="EosInteractorType"
                            t="EosInteractorType">0</e>
                        <l n="Min Spacer Size">2</l>
                            <l n="Max Spacer Size">2000</l>
                        }</tbl> ]</seq>
                    }</tbl> ]</seq>
                    <e n="Layout Style" t="EosOrientation">0</e>
                }</tbl> ]</seq>
            }</tbl>
            <tbl n="Parent Descriptor">{
                <e n="EosViewType" t="EosViewType">2</e>
                <a n="Interactor Name">"MFC Dialog"</a>
                <str n"Caption">"Dialog"</str>
                <e n="EosInteractorType" t="EosInteractorType">0</e>
                <b n="Margin">T</b>
                <e n="Bulletin Board Size" t="EosBulletinBoardSize">2</e>
                <pic n="Background Bitmap">""</pic>
                <e n="Background Bitmap Layout" t="EosBitmapLayout">0</e>
                <e n="EosStructType" t="EosStructType">1</e>
                <a n="Data Type">"PatentIntObject^IntObject"</a>
                <a n="Field Name">""</a>
                <a n="Editor Name">"EosContainerEditor"</a>
                <a n="eosEffectiveTypeName">""</a>
            }</tbl>
            <tbl n="Shell Descriptor">{
                <e n="EosViewType" t="EosViewType">0</e>
                <a n="Interactor Name">"MFC Dialog"</a>
                <l n="Environment Index">0</l>
                <str n="Caption">"Dialog"</str>
                <e n="EosInteractorType" t="EosInteractorType">0</e>
                <l n="Min Container Width">50</l>
                <l n="Min Container Height">50</l>
                <seq n="View Children">[ <tbl/> ]</seq>
                <pic n="Minimized Icon">"COMPANY.ICO"</pic>
                <l n="Width">287</l>
                <l n="Height">239</l>
            }</tbl>
            <pic n="Palette Bitmap">""</pic>
            <a n="eosShellType">"EosCWndShellView"</a>
            <a n="class">"PatentIntObject^IntObject"</a>
        }</tbl>
    }</tbl>
  }</tbl>
}</tbl>
<tbl n="COM Import Type Libs">{
    <tbl n="PatentIntObject">{
        <str n="COM File Path">"D:\COMObjects\PatentInt\PatentIntObject.dll"</str>
        <str n="COM TypeLib Guid">"{44A4DF20-5EDF-11D3-99EE-00A0C98C852D}"</str>
        <l n="COM Major Version">1</l>
        <l n="COM Minor Version">0</l>
        <str n="Pretty Name">"PatentIntObject (Ver 1.0)"</str>
        <str n="TimeStamp">"29291246 1275119184"</str>
    }</tbl>
}</tbl>
<tbl n="Client Management">{
    <b n="Use Client Manager">T</b>
    <a n="Client Manager Class">"PatentIntObject^IntObject"</a>
}</tbl>
<tbl n="Resources List">{
    <tbl n="Pictures">{
```

APPENDIX-continued

```
            <seq n="Pictures">[ <str/> ]</seq>
        }</tbl>
    }</tbl>
}</tbl>
```

What is claimed is:

1. A method for transferring data between a control object of a user interface and an application component of an application program without direct communication between the user interface and the application program, the method comprising:
   accessing, by an application-independent process, from a description file associated with the application program one of (i) a layout description of the control object that is displayed on the user interface and (ii) a connection description associating the control object with the application component of the application program; and
   transferring data representative of a change to one of the application component and the control object.

2. The method of claim 1 further comprising translating content of the description file, by the application-independent processes, to generate the control object and to associate changes represented by the transferred data with one of the control object and the application component.

3. The method of claim 1 further comprising establishing a communication channel between the application-independent client process and the application-independent server process.

4. The method of claim 3 wherein the communication channel is asynchronous.

5. The method of claim 1 wherein the description file is in XML format.

6. The method of claim 1 further comprising generating an instance of the control object.

7. The method of claim 1 wherein the application component comprises a member representative of an attribute of the application component alterable by a user or displayable to the user, further comprising generating an instance of management code, the management code instance mapping the correspondence between the control object and the application component member.

8. The method of claim 1 further comprising generating a container object for each application component and control object.

9. The method of claim 1 wherein the application component comprises a member representative of an attribute of the application component alterable by a user or displayable to the user, further comprising:
   monitoring the application component member and the control object; and
   transferring data in response to a change of state of one of the application component member and the control object.

10. The method of claim 1 wherein the application component comprises a member representative of an attribute of the application component alterable by a user or displayable to the user, further comprising:
   generating a unique identifier for one of the application component member and the control object; and
   referencing the unique identifier in a proxy layer.

11. A server node to enable the update of a user interface element of a user interface without direct interaction between an application program and the user interface, the server node comprising:
   a description file associated with the application program, the description file including one of (i) a layout description of the user interface element and (ii) a connection description associating a control object of the user interface with an application component of the application program; and
   an application-independent process in communication with the application program, the application-independent process accessing the description file, detecting a change of state to the application component and transferring data in response to a detected change of state of the application component.

12. The server node of claim 11 wherein the application-independent process is further configured to update the application component in response to received data, the received data representing a change of a state of the associated control object of the user interface on a client.

13. The server node of claim 11 wherein the description file is in XML format.

14. The server node of claim 12 wherein the application component comprises a member representative of an attribute of the application component alterable by a user or displayable to the user; and wherein the application-independent process further comprises an instance of management code, the management code instance mapping the correspondence between the application component member and a control object located on a client.

15. The server node of claim 11 further comprising a container object for each application component.

16. The server node of claim 11 wherein the application component comprises a member representative of an attribute of the application component alterable by a user or displayable to the user; and wherein the application-independent process further comprises a container object monitoring the application component member associated with that container object and initiating data transfer in response to a change of state of the associated application component member.

17. The server node of claim 11 wherein the application component comprises a member representative of an attribute of the application component alterable by a user or displayable to the user; and wherein the server node further comprises a proxy layer referencing a unique identifier for the application component member.

18. A client node to enable the update of a user interface element of a user interface without direct interaction between an application program and the user interface, the client node comprising:
   a description file associated with the application program, the description file including one of (i) a layout description of the user interface element and (ii) a connection description associating a control object of the user interface with an application component of the application program; and
   an application-independent process in communication with a server, the application-independent process accessing the description file, generating a control object associated with the application component based on the description file and updating the user interface in response to receiving data representing a detected change of state of the application component.

19. The client node of claim 18 wherein the application-independent process is further configured to detect a change of state of the user interface and to transfer data to the application-independent server process in response to the detected change.

20. The client node of claim 18 wherein the description file is in XML format.

21. The client node of claim 18 wherein the application-independent process further comprises an instance of a control object for each of a plurality of user interface elements, the control object instance representing a corresponding user interface element.

22. The client node of claim 18 further comprising a container object for the control object.

23. The client node of claim 18 further comprising a container object monitoring the control object associated with the container object and initiating data transfer in response to a change of state of the associated control object.

24. The client node of claim 18 further comprising a proxy layer referencing a unique identifier for the control object.

* * * * *